United States Patent [19]

Kimura et al.

[11] Patent Number: 4,772,188
[45] Date of Patent: Sep. 20, 1988

[54] SCROLL COMPRESSOR WITH OIL GROOVES IN THRUST BEARING

[75] Inventors: Tadashi Kimura; Masahiro Sugihara; Tetsuzo Matsugi, all of Wakayama, Japan

[73] Assignee: Mitsubishi Denki Kabushiki Kaisha, Tokyo, Japan

[21] Appl. No.: 42,245

[22] Filed: Apr. 24, 1987

[30] Foreign Application Priority Data

May 15, 1986 [JP] Japan ................................. 61-113001

[51] Int. Cl.$^4$ ...................... F04C 18/04; F04C 29/02; F16C 33/10
[52] U.S. Cl. ........................................ 418/55; 418/88; 418/94; 384/123; 384/368
[58] Field of Search .............................. 418/55, 88, 94; 384/123, 368

[56] References Cited

U.S. PATENT DOCUMENTS 2,081,063  5/1937  Oliver ................................. 384/368
4,056,279 12/1977  McCullough ........................ 418/55
4,623,306 11/1986  Nakamura et al. .................. 418/94

FOREIGN PATENT DOCUMENTS 55-144884 10/1980  Japan .
58-113593  7/1983  Japan ................................... 418/55

Primary Examiner—John J. Vrablik
Attorney, Agent, or Firm—Oblon, Fisher, Spivak, McClelland & Maier

[57] ABSTRACT

A scroll compressor comprises an orbiting scroll and a stationary scroll, both being mutually combined to form a compression chamber therebetween. The scroll compressor is provided with a lubricating oil feeding system to lubricate each bearing constituting a contact-sliding and contact-rotating part. A special arrangement of oil grooves is made in a thrust bearing supporting the orbiting scroll in such a manner that pressure loss in the oil grooves of the thrust bearing is greater than a pressure raised by the third oil pump means so that there causes no negative pressure at the inlet port of a radial oil feeding conduit and the outlet of the vertical oil feeding passage in the main shaft.

7 Claims, 7 Drawing Sheets

FIGURE 14(a) *PRIOR ART*
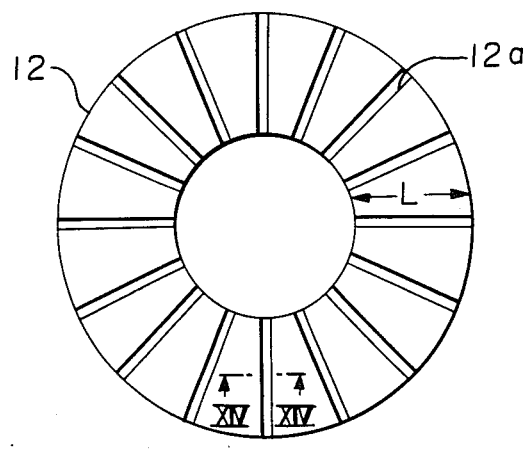
FIGURE 14(b) *PRIOR ART*
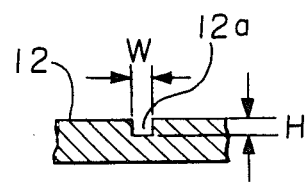

SCROLL COMPRESSOR WITH OIL GROOVES IN THRUST BEARING

BACKGROUND OF THE INVENTION

1. Field of the Invention

The present invention relates to a scroll compressor comprising an orbiting scroll and a stationary scroll. More particularly, it relates to an improvement in a system for lubricating bearings used for a refrigerant scroll compressor 2. Discussion of Background The principle of the scroll compressor of this kind will be described with reference to FIG. 11 showing sequential operations of the scroll compressor. FIG. 11 shows the states that a wrap 1a formed on a stationary scroll 1 is combined with a wrap 2a formed on an orbiting scroll 2. The stationary scroll 1 stands still in space, and the orbiting scroll 2 combined with the statioanry scroll 1 has a phase difference of 180° with respect to the stationary scroll 1. The orbiting scroll 2 is caused to revolve around the center O of the stationary scroll, but it does not rotate itself. The states of the stationary and orbiting scrolls at 0°, 90°, 180° and 270° are respectively shown in FIGS. 11a to 11d. At the angular position of 0° shown in FIG. 11a, a gas-sealing step to confine gas in an intake port 3 is finished, and a compression chamber 5 is formed between the wraps 1a, 2a. As the orbiting scroll 2 revolves, the volume of the compression chamber 5 gradually decreases, and finally, compressed gas is discharged through a discharge port 4 formed at the center of the stationary scroll 1.

FIG. 12 is a longitudinal cross-sectional view of an important portion of a conventional scroll compressor as shown, for instance, in Japanese Patent Application No. 64571/1984. The scroll compressor is used for a hermetic type refrigerant compressor.

In FIG. 12, a reference numeral 1 designates a stationary scroll, immovably placed in space, which has a wrap 1a on a base plate 1b and a dischage port 4 at the center of the base plate 1b, a numeral 2 designates an orbiting scroll which has a wrap 2a on a base plate 2b and a driving shaft 2c projecting from the base plate 2b at the opposite side with respect to the wrap 2a, a numeral 5 designates a compression chamber formed between the wraps 1a, 2a. A main shaft 6 vertically extends in a casing 20. The main shaft fixedly secures the rotor of a motor (not shown) at its lower part, and it has a large diameter part 6a at its top end portion in which an eccentric hole 6b is formed at a position deviated from the axial center of the main shaft, the axial center being designated by an imaginary line 0—0. A bearing 10 is fitted in the eccentric hole 6b and it supports the driving shaft 2c of the orbiting scroll 2 so as to restrict the movement of the driving shaft in the radial direction, whereby an orbiting movement is transmitted to the orbiting scroll 2 when the main shaft 6 is rotated. An oil groove 10a is formed in the bearing 10 along the axial direction. An eccentric oil feeding passage 13 is formed in the main shaft 6 in its axial direction and deviated from the axial center by a distance $R_0$. A space 18 is formed between the lower end of the driving shaft 2c and the bottom surface of the eccentric hole 6b, the space 18 constituting a second oil pump means 22. In the outer circumferential portion of the large diameter portion 6a of the main shaft 6, an axially extending oil groove 6d is formed. A radial oil feeding conduit 15 is formed passing through the large diameter portion 6a and the bearing 10 to communicate the oil groove 10a formed in the bearing 10 with the vertically extending oil groove 6d, the radial oil feeding conduit 15 constituting a third oil pump means 23. The casing 20 receives therein the stationary and orbiting scrolls 1, 2, the main shaft 6 and the electric motor (not shown). A bearing supporter 7 is fixed to and inside the casing 20. The bearing supporter 7 has a central through hole in which the main shaft 6 is supported through a main bearing 11 so that the main shaft 6 is rotatable, while it is restricted to move in the radial direction. The bearing supporter 7 is also positioned below the orbiting scroll 2 to support the same through a thrust bearing 12. At least one oil groove 12a is formed in the radial direction in a surface of the thrust bearing 12 which supports the orbiting scroll 2 in a slidable manner.

A numeral 8 designates an Oldham coupling which causes an orbital movement of the orbiting scroll 2 while it prevents the rotation of the orbiting scroll 2, a numeral 9 designates a covering plate, and a numeral 14 designates an oil returning passage.

An oil cap 16 with an oil hole 16a at its lower part is attached to the lower end of the main shaft 6, the oil cap constituting a first oil pump means 21 in association with the vertical oil feeding passage 13. A lubricating oil 17 is stored in the bottom of the casing 20 and the oil surface level of the lubricating oil is kept so as to immerse the intermediate portion of the oil cap 16.

A cavity 19 is formed between the upper end portion of the large diameter part 6a and the lower surface of the orbiting scroll 2.

In FIG. 12, a thrust bearing and a radial bearing which are placed below the large diameter part 6a of the main shaft 6 are omitted for simplifying the drawing.

The detail of the thrust bearing 12 is shown in FIG. 14. A plurality of oil grooves 12a are formed in the radial direction in the thrust bearing 12. The width W and the depth H of each of the grooves 12a are made large and the length L is made the shortest by extending in the radial direction so as to reduce the resistance in a passage and increase an amount of oil to be fed. Since the width and the depth of each of the oil grooves 12a are relatively large, it is unnecessary to finish the grooves with high accuracy.

The operation of the scroll compressor having the construction as above-mentioned will be described.

When the main shaft 6 is rotated by actuating the electric motor (not shown), the orbiting scroll 2 starts orbital movement by the aid of the Oldham coupling 8, hence, compression of a refrigerant gas is started. Then, the referigerant gas introduced into the intake port of the casing 20 is sucked into the compression chamber 5 through the inlet port 3 of the stationary scroll 1, compressed in the compression chamber, and finally, is forcibly discharged through the discharge port 4 and a discharge tube (not shown).

The lubricating oil 17 stored in the bottom of the casing 20 is forced into the vertical oil feeding passage 13 by centrifugal pumping action of the first oil pump means 21 and is supplied into a space 18. Then, the lubricating oil is pressurized by the second oil pump means 22; is forcibly passed through the oil groove 10a, and lubricates the bearing 10. The lubricating oil is fed in the radial oil feeding conduit 15 where it is pressurized by the third oil pump means 23 and is retuned to the bottom of the casing 20 through the oil groove 6d in the large diameter part 6a, the cavity 19, the oil grooves 12a, and the oil returning hole 14, during which the lubricating oil lubricates the main bearing 11 and the thrust bearing 10 and the thrust bearing 12 and other parts. The covering plate 9 prevents the lubricating oil 17 from being sucked directly into the intake port 3.

FIG. 9 is a diagram showing the distribution of oil pressure in an oil feeding system constituted by a multi-oil pump means in a conventional compressor. In FIG. 9, the ordinate represents oil pressure and the abscissa represents the position of each part in the oil feeding system. A character A represents the inlet of the oil cap 16, a character B represents the inlet of the vertical oil feeding passage 13, a character C represents the outlet of the vertical oil feeding passage 13, a character D represents the inlet of the oil groove 10a in the space 18, a character E represents the inlet of the radial oil feeding conduit 15, a character F represents the outlet of the radial oil feeding conduit 15 and a character G represents the outlet of the oil groove of the thrust bearing 12. Characters $P_1$, $P_2$ and $P_3$ respectively represent pressure increased by the function of the first and second and third oil pump means 21, 22, 23. Characters $\Delta P_1$, $\Delta P_2$, $\Delta P_3$ respectively represent pressure loss at the outlet of each of the oil pump means.

FIG. 9 shows pressure distribution when a flow rate Q of the oil is $\sqrt{2}$ times as the flow rate $Q_1$ (which corresponds to the flow rate in an embodiment of the present invention described below). For simplification, the Figure is illustrated on the assumption that the increasing rate of pressure $P_1$, $P_2$ or $P_3$ by each of the oil pump means is constant and the pressure loss $\Delta P$ is proportional to the square of the flow rate Q.

FIG. 9 shows occurrence of a negative pressure at points C and E in the oil feeding passage.

In the conventional scroll compressor, the capacity of the pump means at each part in the oil feeding passage is increased and resistance in the oil feeding pass is minimized as much as possible to feed a sufficient amount of oil to each bearing part. However, when the compressor is applied to compress a refrigerant (such as Freon $R_{12}$, $R_{22}$), the refrigerant is dissolved in the lubricating oil 17. The dissolved refrigerant is gasified when pressure is reduced or temperature is elevated, and decomposition of the lubricating oil 17 takes place. This results in a so-called foaming, whereby the oil feeding pass is closed by the foamed gas to thereby cause great reduction in oil feeding capability.

When the negative pressure is produced in the oil feeding passage, the refrigerant dissolved in the lubricating oil is separated as foamed gas. The foamed gas greatly reduces the oil feeding capability of the second oil pump means 22, and sometimes, it is impossible to supply the lubricating oil. To eliminate the disadvantage described above, the scroll compressor as shown in FIG. 13 has been proposed. In the scroll compressor, a gas vent hole 24 is formed in the main shaft 6 extending downwardly from the bottom of the eccentric hole 6b in its axial direction and having an opening in the outer circumference of the main shaft 6. In this case, the pressure given by the first oil pump means 21 is changed by the gas vent hole 24, and the first oil pump means 21 does not operate in cooperation with the second and third oil pump means 22, 23 under serially connected condition. Namely, when the first oil pump means 21 is stronger, a pattern to weaken the effect of the first oil pump means is generated so that a continuous flow rate is maintained. On the other hand, when the second and third oil pump means 22, 23 are stronger, a pattern of feeding the oil to weaken these pump means is generated around the gas vent hole 24. In more detail, when the second and third oil pump means 22, 23 become stronger, the gas tends to stay at the central portion of the second oil pump means 22 as the space 18 to reduce the centrifugal pumping action of the oil pump means 22. When the gas is further accumulated, the lubricating oil is pushed to the outer diameter portion with respect to the oil groove 10a, and finally, the space 18 is filled with the gas so that only small stream of the lubricating oil is formed from the outlet of the vertical oil feeding passage 13 to the inlet of the oil groove 10a. When the region of the gas expands to the radial oil conduit 15, the action of the pump becomes weak. Thus, when the second and third oil pump means 22, 23 are stronger than the first oil pump means 21, a sufficient lubrication is not obtained because the gas enters into each of the bearing portions.

FIG. 10 shows the distribution of oil pressure in the oil feeding system constituted by the oil pump means in the scroll compressor shown in FIG. 13. The same characters as in FIG. 9 are used in FIG. 10. Since the gas vent hole 19 is formed, a pressure at the outlet (the point C) of the vertical oil feeding passage 13 is substantially equal to a pressure at the intake port (the point A). Accordingly, a flow rate $Q_1$ given by the first oil means 21 is determined regardless of the characteristics of the second and third oil pump means 22, 23. Similarly, a flow rate $Q_2$ given by the second and third oil pump means 22, 23 is determined regardless of the first oil pump means 21. The flow rate Q is $\sqrt{3/2}$ times as large as the flow rate $Q_{2*}$ in FIG. 9. Since pressure loss of the pressurized oil is small in the oil groove 12a of the thrust bearing 12, a negative pressure is produced at the point E (the inlet of the radial oil feeding conduit 15). When $Q_2 > Q_1$, namely, when the force of the oil pump means 22, 23 is stronger than the first oil pump means 21, there causes reduction in the capacity of the oil pump means 22, 23 so that operation is effected at the point satisfying the condition of $Q_2 = Q_1$, whereby continuous operating condition is maintained.

When $Q_2 > Q_1$, a negative pressure is produced at a part of the oil pump means 22, 23. An elevated pressure $P_2$ by the oil pump means 22 is produced by a centrifugal force acting on the lubricating oil in the space 18 as shown in FIG. 13, and the pressure $P_2$ is obtainable by the following equation:

$$P_2 = K_2 \gamma/(2g) \cdot \omega^2 (R_2^2 - R_1^2) \ldots \tag{1}$$

where $\gamma$ is the specific weight of the oil, g is acceleration of gravity, $\omega$ is the angular velocity of the main shaft 6, $R_1$ is the inner radius of the lubricating oil in a circular form in the space 18, $R_2$ is the radius of the main shaft 6 extending from the axial center to the inlet portion of the radius oil feeding conduit 15 and $K_2$ is a coefficient of correction determined in the consideration of continuous distribution of the oil in the cavity.

It is understandable that increase in pressure by the oil pump means 22 becomes small as the radius $R_1$ becomes large.

Similarly, increase in the pressure $P_3$ by the oil pump means 23 is expressed by the following equation:

$$P_3 = K_3 \gamma/(2g) \cdot \omega^2 (R_3^2 - R_2^2) \ldots \tag{2}$$

where $R_3$ is the radius of the outer circumference of the large diameter part 6a of the main shaft 6 and $K_3$ is a coefficient of correction similar to $K_2$.

As shown in FIG. 10, when the pressure loss $\Delta P_2$, $\Delta P_3$ in the oil pump means 22, 23 are respectively smaller, the inner radius $R_1$ of the oil in the space 18 becomes large, whereby continuity of the flow rate can be maintained with respect to oil supply from the oil pump means 21. When the radius $R_1$ becomes large and it is equal to the radius $R_2$ ($R_1=R_2$), the capacity of the oil pump means 22 becomes zero. In this case, when continuity of the flow rate of the oil can not be maintained with respect to the oil supply from the oil pump means 21, the region of gas expands to the radius oil feeding conduit 15, and the value of the radius $R_2$ becomes substantial in the equation (2). Under the condition, the lubricating oil can not be supplied to each bearing part in a stable manner.

Thus, since the conventional scroll compressor is so constructed that the resistance of the oil feeding passages is made small as possible by increasing the cross-sectional area of the oil groove 12a in the thrust bearing 12, a negative pressure is produced at the inlet portion of the radial oil feeding conduit 15 in the space 18. Accordingly, in the case that the scroll compressor is applied to a refrigerant compressor, the refrigerant in the lubricating oil is gasified to close the oil feeding passage, whereby there may cause damage or seizure of the bearing part.

SUMMARY OF THE INVENTION

It is an object of the present invention to provide a scroll compressor which is especially applicable to a refrigerant compressor wherein a lubricating oil can be supplied to each bearing part in a stable manner so that a highly reliable operation is obtainable.

The foregoing and the other objects of the present invention have been attained by providing a scroll compressor comprising an orbiting scroll having a base plate, a wrap formed on one surface of the base plate and a driving shaft projecting from the other surface of the base plate; a stationary scroll having a base plate and a wrap formed on one surface of the base plate, the wraps of the stationary and orbiting scrolls being combined with each other to form a compression chamber therebetween; a main shaft which has an eccentric hole at its top end and at an eccentric position with respect to the revolution center of the main shaft so as to fittingly receive the driving shaft through a bearing member, and which causes an orbiting motion of the orbiting scroll; a vertical oil feeding passage extending from the eccentric hole to the lower end of the main shaft at a position deviated from the revolution center of the main shaft; a space in the eccentric hole formed between the lower end of the driving shaft and the bottom surface of the eccentric hole; a bearing supporter which is positioned below the orbiting scroll to support the same through a thrust bearing, and which has a central through hole for supporting the outer circumference of the upper part of the main shaft through a main bearing member fixed onto the inner circumference of the central hole; a casing for accommodating the scrolls, the bearing supporter and the main shaft, and storing a lubricating oil at its bottom; a first oil pump means constituted by an oil cap fixed to the lower end of the main shaft, the lower part of the oil cap being provided with an oil inlet and being below the oil surface; a second oil pump means in the eccentric hole; a first oil groove formed in either the sliding surface of the driving shaft or the sliding surface of the bearing member, or in both of them; a second oil groove formed in the outer circumference of the upper part of the main shaft so that the upper end of the second oil groove is communicated with the upper surface of the main shaft, while the lower end of the same is closed in the outer circumference of the main shaft; a radial oil feeding conduit formed in the upper part of the main shaft in the radial direction so that the first oil groove is communicated with the second oil groove, the radial oil feeding conduit constituting a third oil pump means; a third oil groove formed in the bearing surface of the thrust bearing to communicate the inner circumferential part with the outer circumferential part so as to permit feeding of the lubricating oil from the second oil groove, the first, second and third oil pump means circulating the lubricating oil from the bottom part of the casing to lubricate the various bearing members, characterized in that the shape of the third oil groove to be formed in the thrust bearing is so determined that a pressure loss caused by a resistance in the third oil groove is greater than a pressure given by the third oil pump means, and the resistance is greater than a resistance in the other grooves and passages.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 to 6 are respectively plane views showing embodiments of the important part of the scroll compressor according to the present invention, wherein FIG. 1 is a plane view of a first embodiment of a thrust bearing, FIGS. 2 to 4a and 4b are plane views showing second to fourth embodiments of the thrust bearing;

DESCRIPTION OF THE PREFERRED EMBODIMENTS

Figure 12:
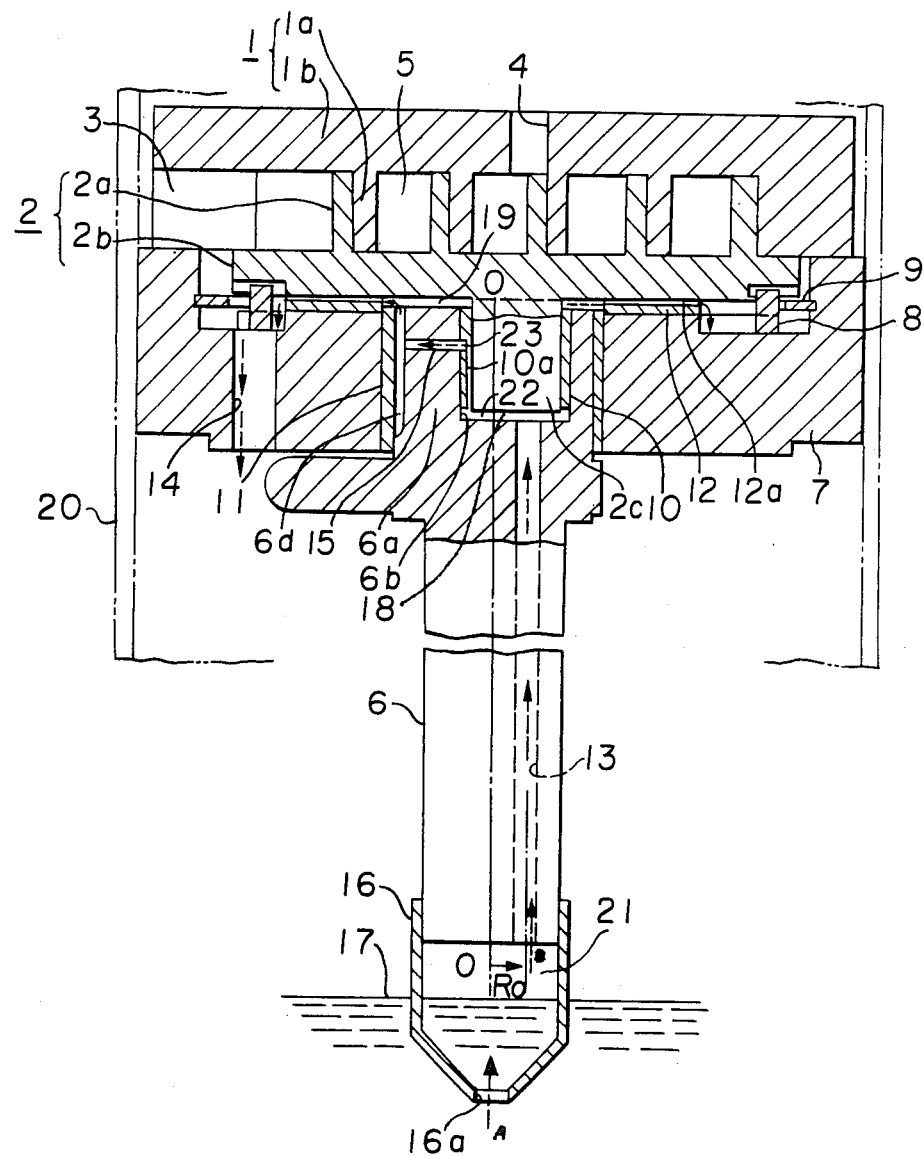
FIG. 12 is a longitudinal cross-sectional view partly omitted of the conventional scroll compressor in which the main shaft is not provided with a gas vent hole.
Figure 13:
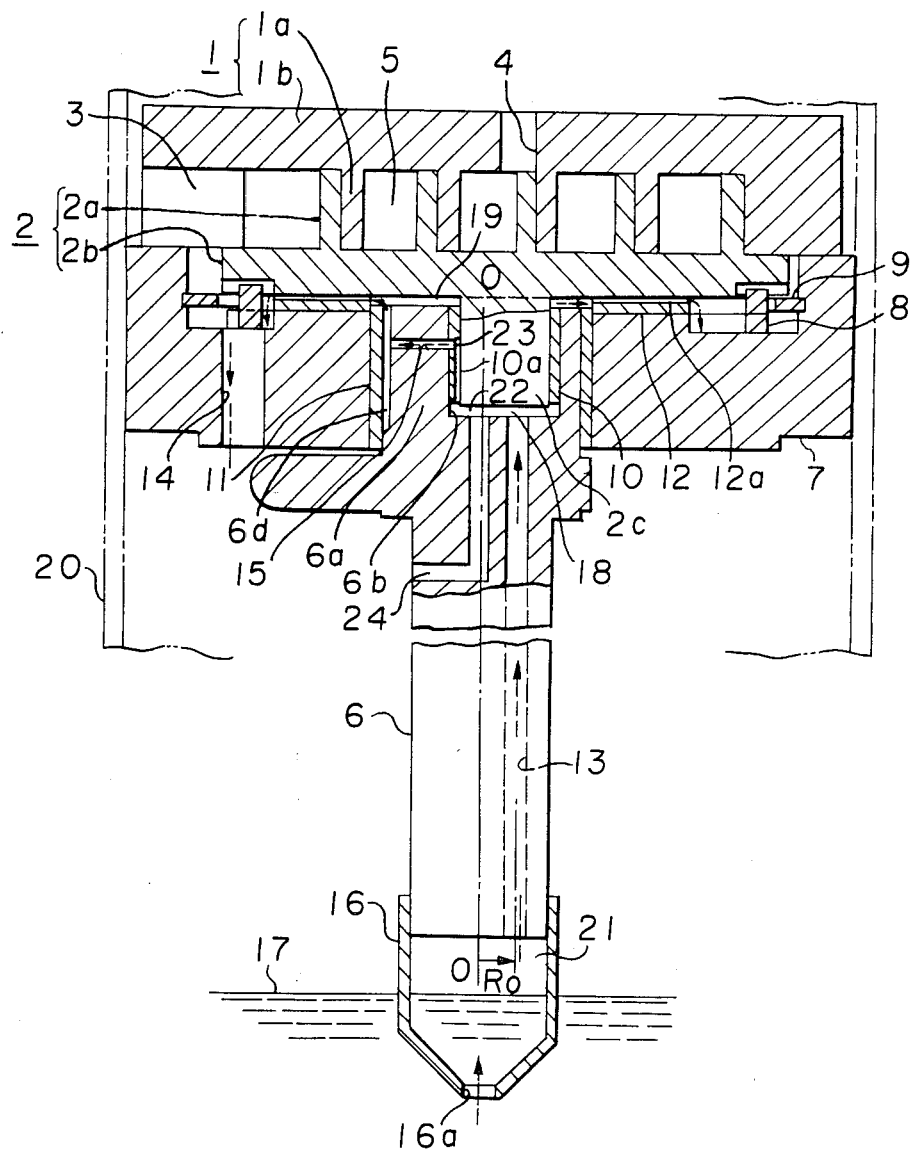
FIG. 13 is a longitudinal cross-sectional view partly omitted of the conventional scroll compressor in which the main shaft is provided with a gas vent hole; and, FIGS. 14a and 14b are respectively a plane view and a cross-sectional view partly omitted of the thrust bearing used in the conventional scroll compressor.

Referring now to the drawings, wherein the same reference numerals as in FIGS. 12 and 13 designate the same parts.

Figure 1:
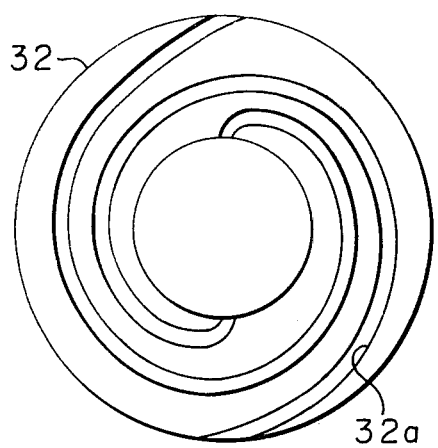

FIG. 1 is a plane view of a thrust bearing used for an embodiment of the scroll compressor according to the present invention. In the bearing surface of a thrust bearing 32, two oil grooves 32a in a spiral form are formed. Each of the oil grooves 32a extends from the inner circumferential part to the outer circumferential part while each of the oil grooves circulates once in the bearing surface. The length and the number of the oil grooves 32a are determined in such a manner that the pressure loss $\Delta P_3$ of the lubricating oil flowing in the oil grooves 32a is greater than a pressure $P_3$ raised by the third oil pump means in consideration of a cross-sectional area of the grooves. The pressure $P_3$ is specifically determined by the length of the radial oil feeding conduit 15, namely, the length is given by the radius extending from the axial center of the main shaft 6 to the inlet of the conduit 15 and the outer radius of the large diameter part 6a. Further, the cross-sectional area of each of the grooves and passages for flowing the lubricating oil are made large so that the pressure loss of the lubricating oil passing through the vertical oil feeding passage 13 and the oil groove 10a formed in the bearing 10 is smaller than the pressure loss of the lubricating oil passing through the oil grooves 32a formed in the thrust bearing.

Figure 7:
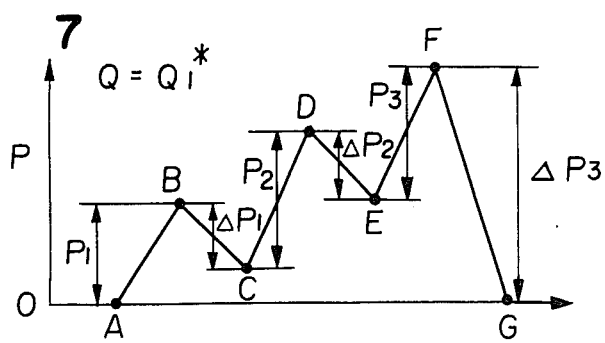
FIG. 7 is a diagram showing pressure distribution in an oil feeding system for the scroll compressor in which the thrust bearing shown in any of FIGS. 1 to 6 is used and a main shaft is not provided with a gas vent hole.
Figure 8:
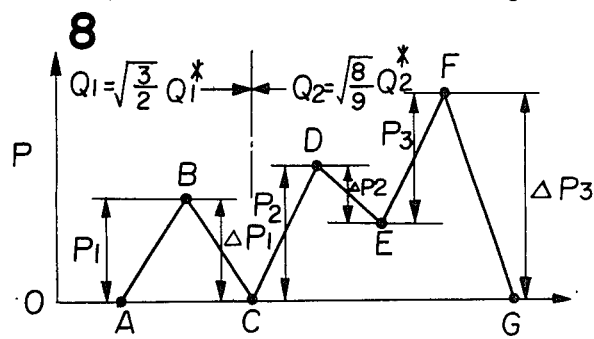
FIG. 8 is a diagram showing pressure distribution in an oil feeding system for the scroll compressor in which the thrust bearing shown in any of FIGS. 1 to 6 is used and a main shaft is provided with a gas vent hole.

In the scroll compressor having the construction as above-mentioned, the lubricating oil 17 passes through the course of the oil cap 16→the vertical oil feeding passage 13→the bottom portion of the eccentric hole 6b→the oil groove 10a in the bearing→the radial oil feeding conduit 15→the oil groove 6d→the cavity 15 formed at the upper end of the large diameter part 6a→the oil grooves 32a→the oil returning hole 14→the bottom of the casing 20, while the lubricating oil lubricates each of the bearing parts. In this case, the pressure loss of the lubricating oil flowing in the oil grooves 32a is greater than a pressure raised by the third oil pump means 23 constituted by the radial oil feeding conduit 15 and is greater than the pressure loss in the oil feeding passage system extending to the oil grooves 32a. Accordingly, the pressure distribution as shown FIGS. 7 and 8 is obtainable, whereby occurrence of a negative pressure is avoidable when the lubricating oil flows in the bearing parts, hence, there is no invasion of gas.

Since the oil grooves 32a are in the spiral form and are around once, the flow path can be prolonged; uniform lubrication of the bearing surface can be attained; the number of grooves can be small, and the pressure loss of the lubricating oil can be easily increased.

For the two spiral oil grooves 32a in one turn, the oil grooves may have another shape as long as they provide a long paths and perform uniform lubrication to the bearing surface. They may be extended in the circumferential direction and the number of the grooves can be determined as desired.

FIGS. 2 to 6 show respectively different embodiments of the thrust bearing according to the present invention.

Figure 2:
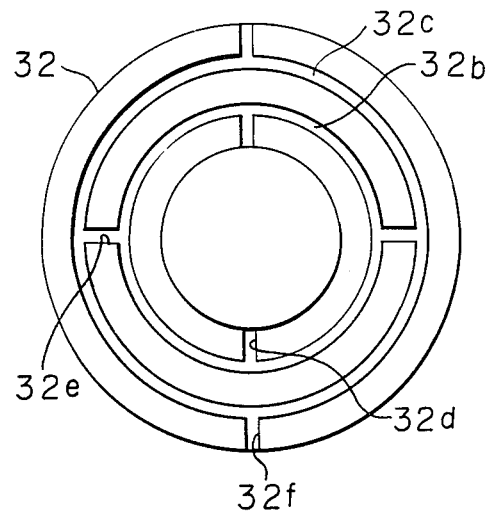

In the embodiment show in FIG. 2, the bearing surface of the thrust bearing 32 has two annular oil grooves 32b, 32c which are coaxially arranged, two radially extending oil grooves 32d to connect the inner circumferential part of the thrust bearing 32 with the innermost annular oil groove 32b, a plurality of oil grooves 32e (two oil grooves in this embodiment) which are formed at 90° shifted positions from the oil grooves 32d and which extends in the radial direction to communicate the inner annular groove 32b with the outer annular oil groove 32c and a plurality of radially extending oil grooves (two in this embodiment) 32f which are formed at 90° shifted positions from the oil grooves 32e and which connects the outer circumferential part of the thrust bearing 32 with the outer annular oil groove 32c.

By arranging several kinds of oil grooves as above-mentioned, the length of the oil feeding passages from the inner circumferential part to the outer circumferential part of the thrust bearing is increased. The number of the annular oil grooves 32b, 32c and radially extending oil grooves 32d, 32e, 32f may be suitably selected as far as a sufficient lubrication and a predetermined resistance of the feeding path can be obtained.

Figure 3:
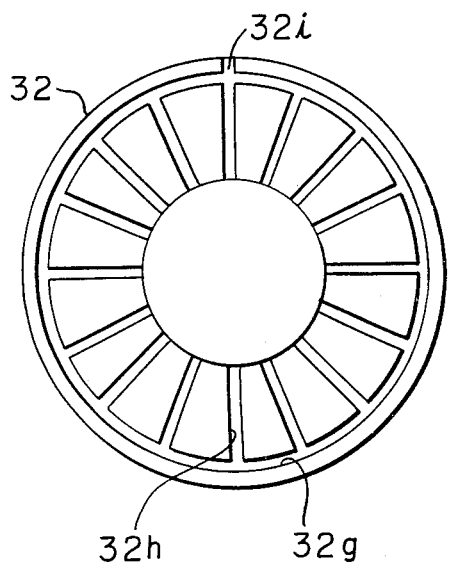
Figure 4:
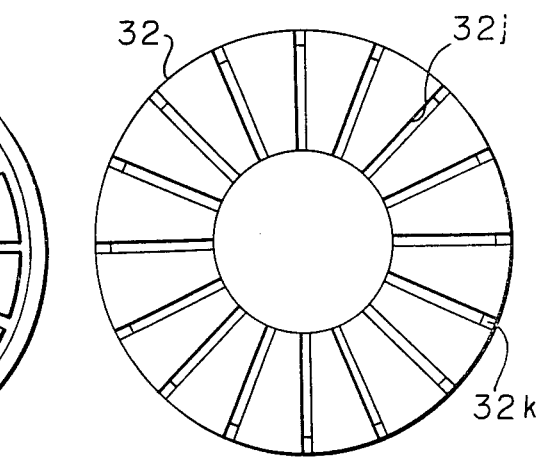
Figure 4:
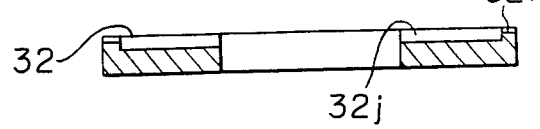

In the thrust bearing 32 shown in FIG. 3, a single annular oil groove 32g is formed near the outer circumferential part of the surface of the bearing 32. A plurality of radial oil grooves 32h are extended from the inner circumferential part in the radial direction so as to be communicated with the annular oil groove 32g so that the lubricating oil lubricates uniformly the bearing surface. A small number of oil grooves 32i are formed so that they extend radially to communicate the annular oil groove 32g with the outer circumferential part of the thrust bearing 32.

In FIG. 3, only one oil groove 32i is formed. However, one or more additional oil grooves 32i may be formed to give a predetermined resistance in the oil feeding path, or the cross-sectional area of the oil groove 32i may be changed.

The thrust bearing 32 shown in FIGS. 4a and 4b has a number of radial oil grooves 32j in the bearing surface so as to extend from the inner circumferential part to the outer circumferential part, in which a throttling portion 32k is formed in each of the oil grooves 32j near the outer circumferential part to increase resistance of the flow path. The throttling portion 32k is formed by shallowing the depth of the groove. Thus, by arranging uniformly a number of the radial oil grooves 32j in the bearing surface, the lubricating oil supplied under a high pressure uniformly lubricates the bearing surface.

Figure 5A:
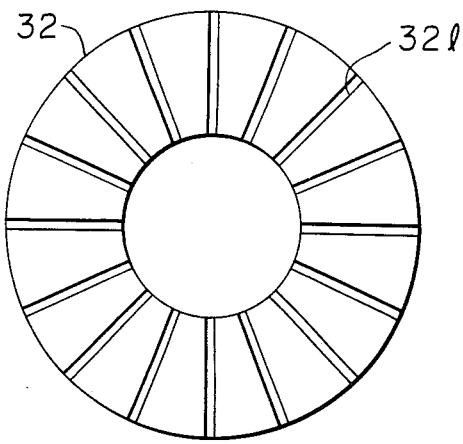
FIGS. 5a and 5b are respectively a plane view and a cross-sectional view showing a fifth embodiment of the thrust bearing; and, FIGS. 6a and 6b are respectively a plane view and a cross-sectional view partly omitted of the thrust bearing.
Figure 5B:
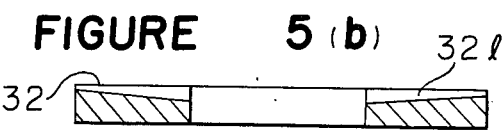

FIGS. 5a and 5b show the thrust bearing 32 according to another embodiment of the present invention and it has a number of radial oil grooves 32l so as to extend from the inner circumferential part to the outer circumferential part. Each of the oil grooves 32l has a slanted bottom in which the depth of the groove is gradually decreased from the inner circumferential part to the outer circumferential part of the thrust bearing 32. The oil grooves 32l as shown in FIG. 5 sufficiently lubricate the bearing surface and increase the resistance in the oil feeding path.

The oil grooves may be formed by pressing or cutting operations without requiring accuracy. It is also possible to increase resistance in the oil feeding path without increasing the length of the path by finishing the oil grooves with high accuracy and reducing the cross-sectional area of the grooves.

Figure 6A:
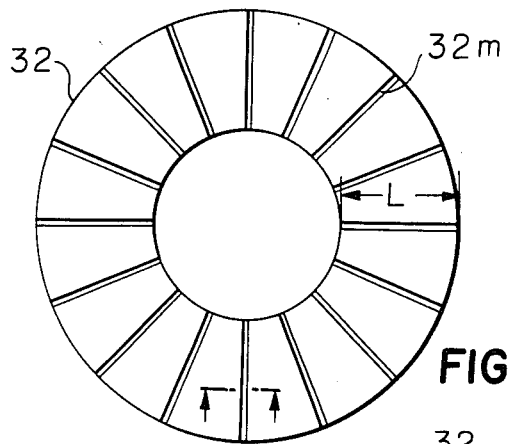
Figure 6B:
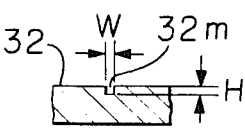

FIGS. 6a and 6b show a thrust bearing 32 with a plurality of radial oil grooves 32m which are finely finished. The oil grooves 32m extend from the inner circumferential part to the outer circumferential part. As shown in FIG. 6b, the width W and the depth H of the oil groove 32m have extremely small dementions to increase the resistance of the oil feeding path. For instance, the oil groove 32m has a depth of 0.15 mm-0.25 mm. The depth of the oil groove 12a of the conventional thrust bearing 12 shown in FIG. 14 is in the range from 0.4 mm to 0.5 mm.

In the embodiment shown in FIG. 6, the pressure loss $\Delta P_3$ caused in the oil grooves 32m (which is determined by the length L, the width W, the depth H and the number) is determined so as to satisfy the following equations (4) and (5) which are described below.

Figure 9:
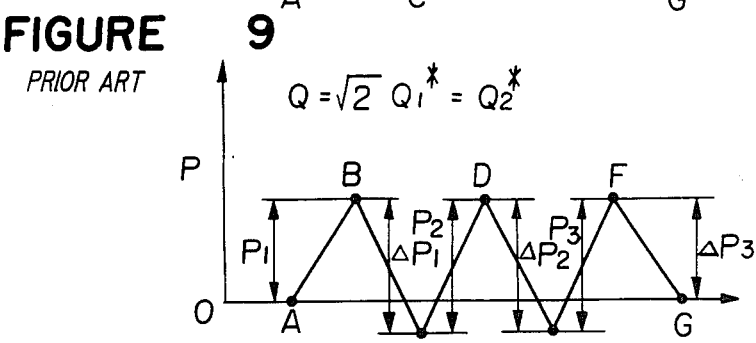
FIG. 9 is a diagram showing pressure distribution in an oil feeding system for the compressor shown in FIG. 12.

FIG. 7 is a diagram showing oil pressure distribution in an oil feeding system using a multi-stage oil pump means which has the thrust bearing 32 as described above on the scroll compressor shown in FIG. 12. The same characters as in FIG. 9 indicate the same parts.

From the diagram shown in FIG. 7, it is apparent that the pressure loss $\Delta P_3$, which follows the third oil pump means 23, is the greatest and pressures at any point in the oil feeding path is higher than the pressure at the intake port (the pressure at the point A). In the diagram, the flow rate Q of oil is equal to the value $Q_{1*}$.

Figure 10:
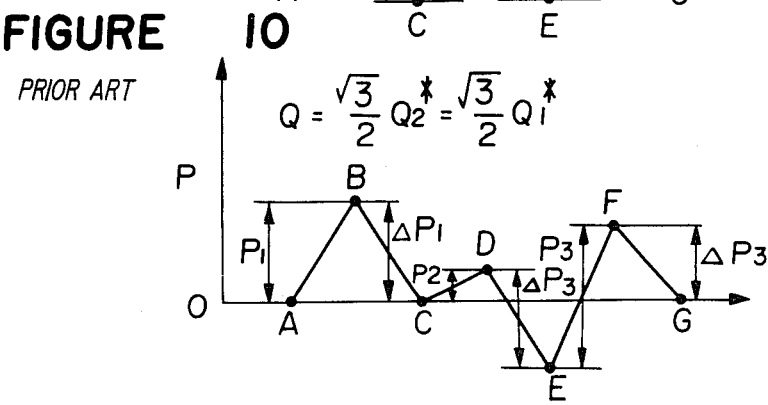
FIG. 10 is a diagram showing pressure distribution in an oil feeding system for the compressor shown in FIG. 13.
Figure 11A:
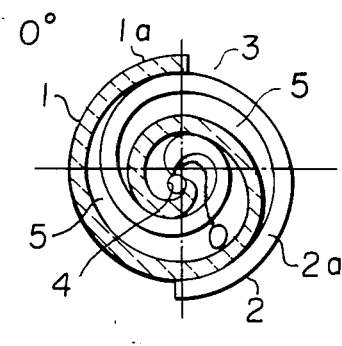
FIGS. 11a to 11d are diagrams showing the principle of the operation of a typical scroll compressor.
Figure 11D:
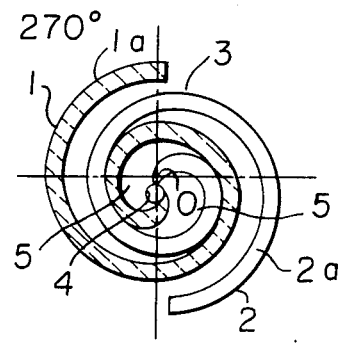
Figure 11B:
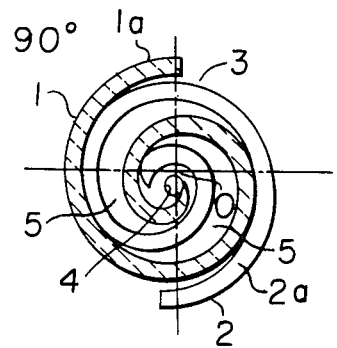
Figure 11C:
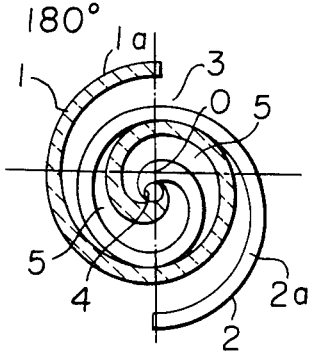

FIG. 8 is a diagram showing oil pressure distribution in an oil feeding system using a multi-stage oil pump means which has the thrust bearing 32 having the construction as in the above-mentioned embodiment on the scroll compressor shown in FIG. 13. The diagram corresponds to that of FIG. 10 and the same characters designate the same parts.

In FIG. 8, the oil pressure at the outlet point C of the vertical oil feeding passage 13 is equal to the pressure at the inlet point A because the gas vent hole 24 is formed. However, the pressure loss $\Delta P_3$ is large because the oil grooves formed in the thrust bearing 32 which is provided at the last stage of the oil feeding path have a large resistance, hence, the oil pressure at the point F is high. Accordingly, there is no risk of occurrence of a negative pressure at the point E, as it was found in the conventional scroll compressor.

When the energy of the oil pump means 22 and 23 is dominant with respect to the flow rate $Q_1$ caused by the oil pump means 21, the capacity of the oil pump means 22 and 23 decreases to satisfy the condition of continuous operation and is acutuated to give a relation of $Q_2 = Q_1$ as shown in FIG. 8.

Pump characteristics and the resistance of the oil feeding path of the first to third oil feeding pump means 21, 22, 23 are so determined as to satisfy the ranges as in the following equations, whereby there can be avoidable problems on the lubrication of the bearing parts due to the negative pressure and expansion of the region of gas in the space 18:

$$P_1 \geq \Delta P_1 \ldots \quad (3)$$

$$P_3 < \Delta P_3 \ldots \quad (4)$$

$$P_2 > K_2 \gamma/(2g) \cdot \omega^2 (R_2^2 - R_{min}^2) \ldots \quad (5)$$

where $R_{min}$ is the inner radius of the oil in the space 18 in which the condition of $K_2 \omega/(2g) \cdot \omega^2 (R_2^2 - R_{min}^2) = \Delta P_2$ is satisfied, and the $R_{min}$ is the greatest innner radius when the pressure of the space does not become a negative pressure.

The most reliable and the effective way to satisfy the condition is to determine the pressure loss $\Delta P_1$, $\Delta P_2$ by the oil pump means 21, 22 to be small as possible. Namely, the resistance of hydrodynamics in the thrust bearing 32 is made the greatest and adjustment is made to be $R_1 < R_{min}$ to maintain stable oil feeding condition.

In the above-mentioned embodiments, the oil groove 10a is formed in the bearing 10. However, such groove may be formed in the outer circumference of the driving shaft 2c, or both the bearing 10 and the driving shaft 2c.

As described above, in accordance with the present invention, the oil grooves formed in the thrust bearing (which is placed at the last stage in the oil feeding pass) are formed so that resistance of hydrodynamics of the oil grooves is the greatest among the resistance at any stage in the path, the pressure raised by the third oil pump means, as the last stage, is smaller than the pressure loss caused in a path extending from the outlet of the third oil pump means to the outlet of the thrust bearing. Accordingly, there is no such position that an oil pressure in the oil feeding path is lower than the pressure at the oil intake port, whereby the lubricating oil can be supplied to each of the bearing parts in a stable manner and highly reliable operations can be obtained. When the oil feeding system of the present invention is applied to a refrigerant compressor, gasification of the refrigerant is avoidable and inversion of gas into an oil stream is prevented, whereby a reliable lubrication to the bearing parts can be attained.

Obviously, numerous modifications and variations of the present invention are possible in light of the above teachings. It is therefore to be understood that within the scope of the appended claims, the invention may be practiced otherwise than as specifically described herein.

What is claimed is:

1. A scroll compressor comprising:
an orbiting scroll having a base plate, a wrap formed on one surface of said base plate and a driving shaft projecting from the other surface of said base plate,
a stationary scroll having a base plate and a wrap formed on one surface of said base plate, the wraps of said stationary and orbiting scrolls being combined with each other to form a compression chamber therebetween,
a main shaft having an eccentric hole at its top end and at an eccentric position with respect to the revolution center of the main shaft and a bearing member in said eccentric hole, said driving shaft being fitted in said eccentric hole and rotatably supported by said bearing member, whereby rotation of said main shaft causes an orbiting motion of said orbiting scroll,
a vertical oil feeding passage extending from said eccentric hole to the lower end of the main shaft at a position deviated from the revolution center of the main shaft,
a space in said eccentric hole formed between the lower end of said driving shaft and the bottom surface of said eccentric hole,
a bearing supporter which is positioned below said orbiting scroll,
a thrust bearing positioned between said bearing supporter and said orbiting scroll for supporting said orbiting scroll, said thrust bearing and bearing supporter having a central through hole including a main bearing member, wherein the outer circumference of the upper part of said main shaft is supported via said main bearing member fixed onto the inner circumference of the central hole, a casing for accommodating said scrolls, said bearing supporter and said main shaft, and storing a lubricating oil at its bottom, a first oil pump means constituted by an oil cap fixed to the lower end of said main shaft, the lower part of said oil cap being provided with an oil inlet and being below the oil surface, a second oil pump means in said eccentric hole, a first oil groove formed between the sliding surface of said driving shaft and the sliding surface of said bearing member, a second oil groove formed in the outer circumference of the upper part of said main shaft so that the upper end of said second oil groove is communicated with the upper surface of the main shaft, while the lower end of the same is closed in the outer circumference of the main shaft, a radial oil feeding conduit formed in the upper part of said main shaft in the radial direction so that said first oil groove is communicated with said second oil groove, said radial oil feeding conduit constituting a third oil pump means, a third oil groove formed in the bearing surface of said thrust bearing to communicate the inner circumferential part with the outer circumferential part of the upper part of said main shaft so as to permit feeding of said lubricating oil from said second oil groove, said first, second and third oil pump means circulating the lubricating oil from the bottom part of said casing to lubricate said various bearing members, characterized in that the shape of said third oil groove to be formed in said thrust bearing is so determined that a pressure loss caused by resistance in the third oil groove is greater than a pressure given by said third oil pump means, and said resistance is greater than a resistance in the other grooves and passages.

2. The scroll compressor according to claim 1, wherein said third oil groove is constituted by a plurality of spiral grooves extending from the inner circumferential part to the outer circumferential part of said thrust bearing.

3. The scroll compressor according to claim 1, wherein said third oil groove is constituted by a plurality of annular oil grooves, a plurality of communication grooves extending in the radial direction to communicate the annular oil grooves with each other, at least one of oil feeding grooves extending in the radial direction from the inner circumferential part of said thrust bearing to the innermost annular oil groove, and at least one of oil discharging groove extending in the radial direction from the outermost annular groove to the outer circumferential part of said thrust bearing.

4. The scroll compressor according to claim 1, wherein said third oil groove is constituted by an annular oil groove formed near the outer circumferential part of said thrust bearing, a plurality of radial oil grooves extending from the inner circumferential part to said annular oil groove, and at least one oil discharging groove extending in the radial direction from said annular oil groove to the outer circumferentrial part of said thrust bearing.

5. The scroll compressor according to claim 1, wherein said third oil groove is constituted by a plurality of radial oil grooves extending in the radial direction in which a throttling part is formed in each of the radial oil grooves at a position near the outer circumferential part so that the depth of the grooves is made shallow at the outer circumferential part of said thrust bearing.

6. The scroll compressor according to claim 1, wherein said third oil groove is constituted by a plurality of radial oil grooves extending in the radial direction in which the bottom of each of the radial oil grooves is slanted so that the depth of the groove becomes gradually shallow toward the outer circumferential part of said thrust bearing.

7. The scroll compressor according to claim 1, wherein a gas vent hole is formed in said main shaft so that it opens at the bottom surface of said eccentric hole, extends downwards along the axial line of said main shaft and opens at the outer circumferential surface of said main shaft.

* * * * *